UNITED STATES PATENT OFFICE.

JOSEPH O. BALL, OF SPRINGFIELD, MASSACHUSETTS.

WELDING COMPOUND.

SPECIFICATION forming part of Letters Patent No. 353,112, dated November 23, 1886.

Application filed May 26, 1886. Serial No. 203,274. (No specimens.)

*To all whom it may concern:*

Be it known that I, JOSEPH O. BALL, a citizen of the United States, residing at Springfield, in the county of Hampden and State of Massachusetts, have invented a new and useful composition of matter to be used in welding iron and steel, or for restoring burned steel to its normal condition, of which the following is a specification.

My composition consists of the following ingredients, combined in the proportions stated, viz: oxide of zinc, fifty per cent.; common sand, fifty per cent., both by measure. These ingredients are to be thoroughly mingled in a dry state.

The sand may, if desired, be pulverized previous to mixing it with the oxide of zinc, and when the composition is to be used for welding small articles it is sometimes more convenient to use the sand in a pulverized state, as it aids in causing the composition to better retain its place upon the pieces to be welded.

In using the above-named composition for welding, the iron or steel is heated to the same degree that it should be for welding in the ordinary way with borax, and the composition is applied thereto in the same manner that the latter is. By the use of said composition a welded joint is formed in which the united parts have a greater tenacity for each other than when borax is used, the result of the welding being practically a homogeneous union of the welded parts.

In restoring by the use of said composition burned steel to its normal or former condition the latter is heated to such a degree as in the judgment of the operator it may be submitted to without danger of further injuring its quality, and while in this state the said composition is applied to the surface of the metal; or, if it be the end of a bar which is burned, said end may be buried in the composition, letting it absorb as much thereof as it may, and after said bar has become cold it will be found to have been restored substantially to the condition in which it was before it was injured by burning.

The aforesaid proportions of oxide of zinc and of sand in said composition are those generally employed by me for the purpose set forth; but substantially the same welding or restoring results may be obtained if said proportions be varied somewhat from those given.

What I claim, and desire to secure by Letters Patent of the United States, is—

The herein-described composition of matter to be used for welding iron and steel, consisting of oxide of zinc and sand, in about the proportions specified.

JOSEPH O. BALL.

Witnesses:
WM. H. CHAPIN,
H. A. CHAPIN.